United States Patent [19]

Anzai

[11] Patent Number: 5,067,024
[45] Date of Patent: Nov. 19, 1991

[54] RECORDING APPARATUS WITH CONTROL OF STORED OVERLAPPING FORM DATA FOR TWO SIDED PRINTING

[75] Inventor: Katsuhiko Anzai, Ichihara, Japan

[73] Assignee: Canon Kabushiki Kaisha, Tokyo, Japan

[21] Appl. No.: 670,401

[22] Filed: Mar. 15, 1991

Related U.S. Application Data

[63] Continuation of Ser. No. 374,657, Jun. 30, 1989, abandoned.

[30] Foreign Application Priority Data

Jul. 8, 1988 [JP] Japan ................................ 63-168869

[51] Int. Cl.⁵ .......................... H04N 1/21; H04N 1/23
[52] U.S. Cl. ...................................... 358/296; 358/444
[58] Field of Search ............... 358/296, 444, 300, 302, 358/401; 364/519, 518; 355/26

[56] References Cited

U.S. PATENT DOCUMENTS

| | | | |
|---|---|---|---|
| 4,079,458 | 3/1978 | Rider | 364/930 |
| 4,086,660 | 4/1978 | McBride | 364/930 |
| 4,450,453 | 5/1984 | Kitamura | 346/108 |
| 4,831,583 | 5/1989 | Pascoe | 364/519 |

FOREIGN PATENT DOCUMENTS

| | | |
|---|---|---|
| 119720 | 9/1984 | European Pat. Off. . |
| 131966 | 1/1985 | European Pat. Off. . |
| 200222 | 11/1986 | European Pat. Off. . |

*Primary Examiner*—Benjamin R. Fuller
*Assistant Examiner*—Scott A. Rogers
*Attorney, Agent, or Firm*—Fitzpatrick, Cella, Harper & Scinto

[57] ABSTRACT

There is disclosed an apparatus for effectively controlling overlay recording on one side or both sides of a sheet. The apparatus is provided with a data input unit, a first memory for storing format data, an output unit for overlaying the data from the input unit with the format data of the first memory, and a second memory for storing the prior format data in introducing new format data into the first memory, thereby preventing the loss of format data at the shifting of overlay format.

11 Claims, 7 Drawing Sheets

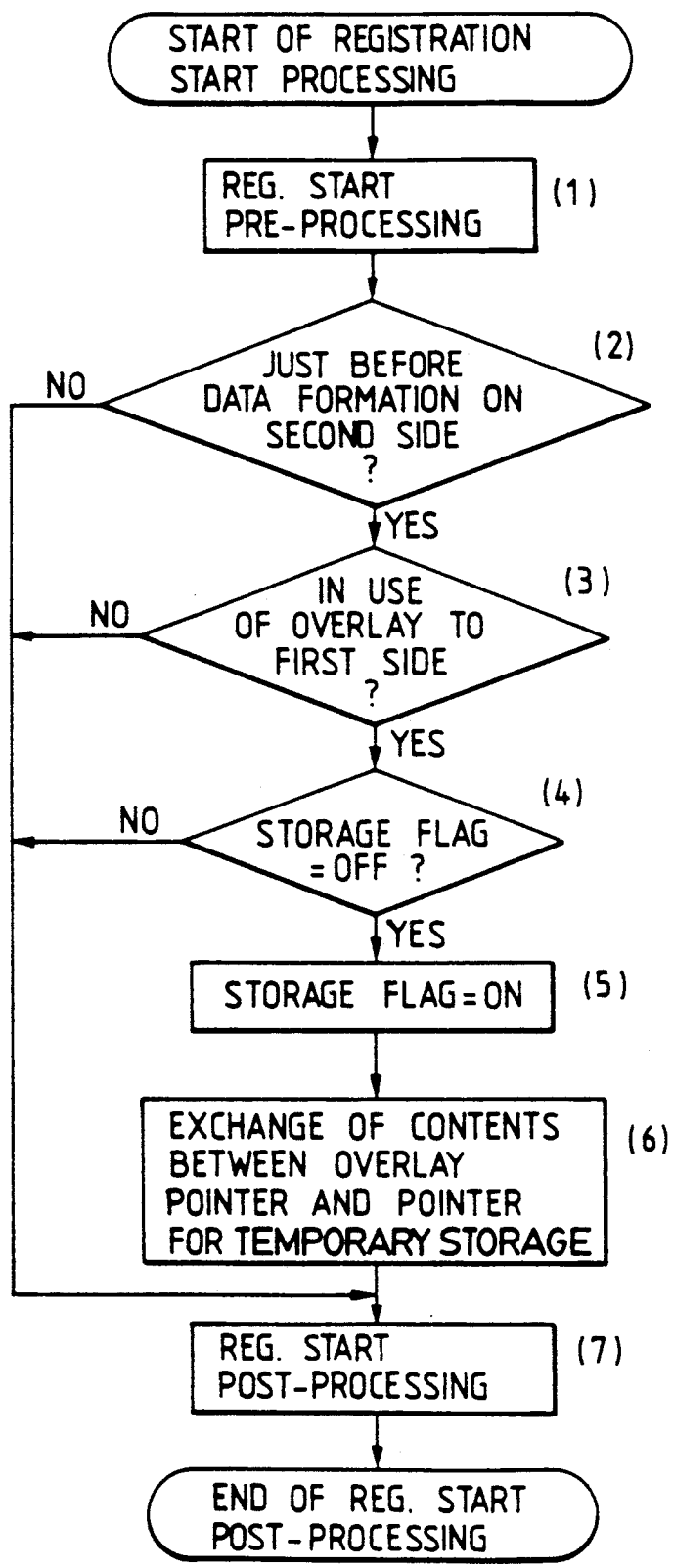

RECORDING APPARATUS WITH CONTROL OF STORED OVERLAPPING FORM DATA FOR TWO SIDED PRINTING

This application is a continuation of application Ser. No. 07/374,657, filed June 30, 1989 now abandoned.

BACKGROUND OF THE INVENTION

1. Field of the Invention

The present invention relates to an apparatus for controlling overlay recordings in which plural images are overlaid in recording.

2. Related Background Art

There has already been proposed a two-side printing apparatus capable of temporarily storing the input print data and selectively printing said data on one face or both faces of a transported sheet-shaped recording medium.

Also, there has been proposed a two-side printing apparatus provided with a form overlay function for overlaying input print data P1 with a fixed format F1, for example, of an account book, a slip or the like, as shown in FIG. 10. In the conventional one-side printing apparatus, the overlay format can be registered between the data of pages, namely immediately after the feeding of form sheet or after the resetting operation. However, in the two-side printing apparatus, the printing operation is possible only when the data are prepared for the first and second faces due to the restriction on the structure of the apparatus. Thus, when the overlay format registered for the first face, is registered for the second face, the already-registered overlay format is erased and replaced by a new format, and the intended result cannot be obtained.

SUMMARY OF THE INVENTION

In consideration of the foregoing, an object of the present invention is to provide a recording control apparatus capable of precise overlay recording on a recording material.

Another object of the present invention is to provide a recording control apparatus capable of efficient overlay recording on both sides of a recording material.

Still another object of the present invention is to provide a recording control apparatus capable of secure administration of recording information in the overlay recording on both sides of a recording material.

Still another object of the present invention is to provide a recording control apparatus capable, in forming images by overlaying the stored format information on both sides of the recording material, of storing the overlay format for the first face and that for the second face individually according to the state of printing on both sides, thereby efficiently effecting the printing on both sides with overlay formats on respective sides while preventing the loss of or alteration in the overlay format.

Still another object of the present invention is to provide a recording control apparatus capable, in overlay recording on both sides, of preventing loss of or alteration of the already registered overlay data even if the registration of the overlay information is executed immediately before the start of recording on the respective sides.

The foregoing and still other objects and features of the present invention, and the advantages thereof, will become fully apparent from the following description to be taken in conjunction with the attached drawings.

BRIEF DESCRIPTION OF THE DRAWINGS

FIG. 4 is a flow chart showing an example of overlay format registration according to the present invention;

DESCRIPTION OF THE PREFERRED EMBODIMENTS

Figure 1:
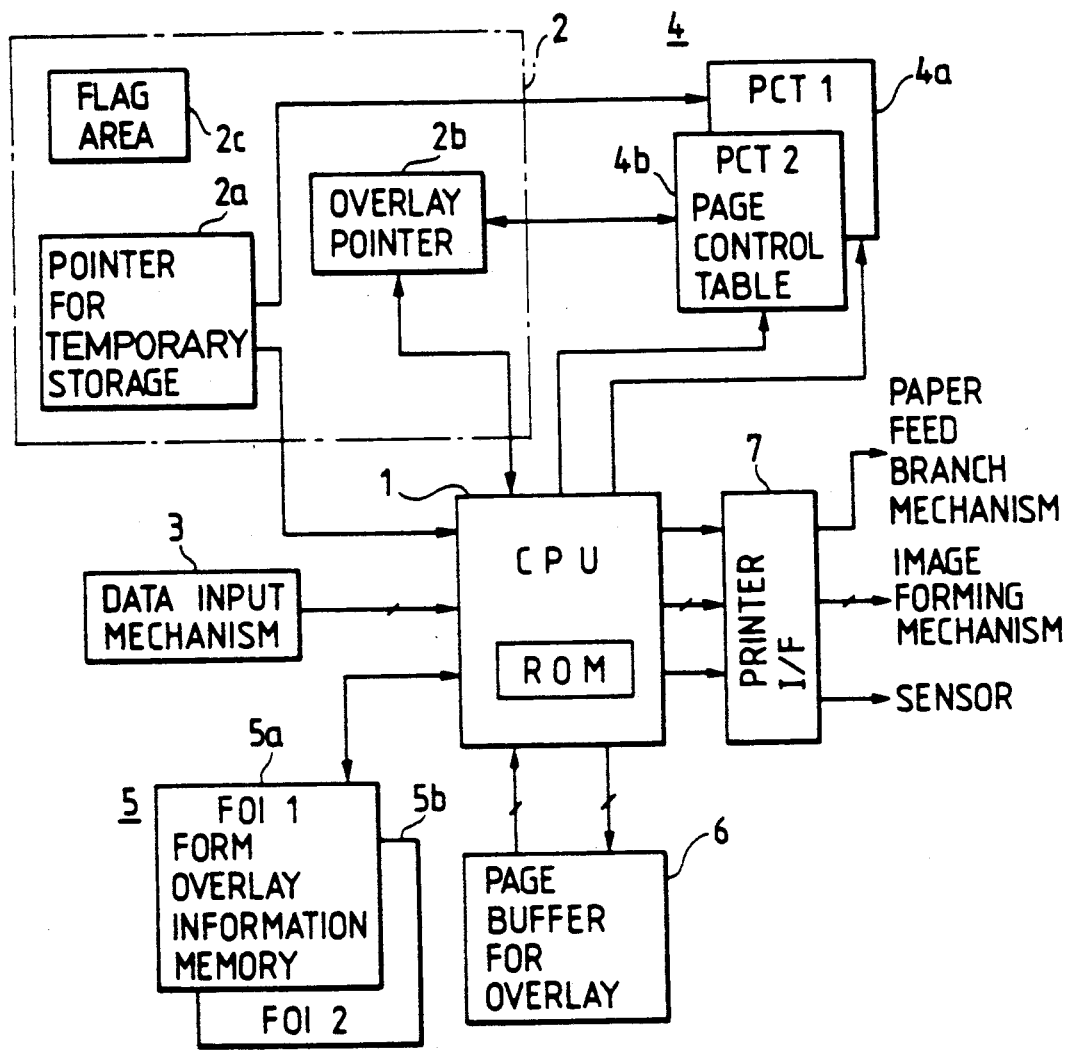
FIG. 1 is a block diagram of a two-side printing apparatus embodying the present invention.

FIG. 1 is a block diagram of a two-side printing apparatus embodying the present invention, in which a CPU 1 collectively controls the reception of print information and the supply of print information to a printer, according to a control program stored in a ROM.

An administration information memory 2, composed for example of a RAM, is provided with a temporary storage pointer 2a, an overlay pointer 2b, and a flag area 2c. The overlay pointer 2b functions as instruction means, for instructing, in succession, the registration of overlay information in page control tables 4a, 4b of a page control table flag area 4 constituting form information memory means. An overlay form information memory unit 5 is composed for example of overlay form information memories 5a, 5b storing fixed format images to be overlaid in the two-side printing. An overlay page buffer 6 is composed of a bit map memory, and serves to store the image data corresponding to the printing information entered from a data input mechanism 3, and arbitrary fixed format image information stored in the overlay format information memories 5a, 5b and page control tables 4a, 4b in overlaid manner and to be subjected to data reading under the control of the CPU 1 for supply of the overlaid image data to an image forming mechanism through a printer interface 7.

When arbitrary format information to be developed in the overlay page buffer 6 is stored in the page control tables 4a, 4b serving for storing plural format information, the CPU 1 selects, in succession, the format information stored in one of said page control tables 4a, 4b and develops the selected format information in the overlay page buffer 6, in overlay with the print information developed therein.

When the destinations of storage are designated by the overlay pointer 2b in succession, in response to the request for storage of format information into the page control tables 4a, 4b, the CPU 1 independently administers the format information stored in a page control table 4a designated as first and that stored in the other page control table 4b designated as second, thereby maintaining the order of storage.

Also, when the CPU 1 administers the format information stored in a page control table 4a by the temporary storage pointer 2a, the CPU 1 gives priority to the storage in response to the request for storage of the format information into the page control table 4a, in comparison with that into the other page control table 4b, thereby temporarily storing the format information already stored in said page control table 4a. Then, after the two-side printing operation, the temporary storage pointer 2a is cleared, and the content of the page control table 4a is cleared.

Figure 2:
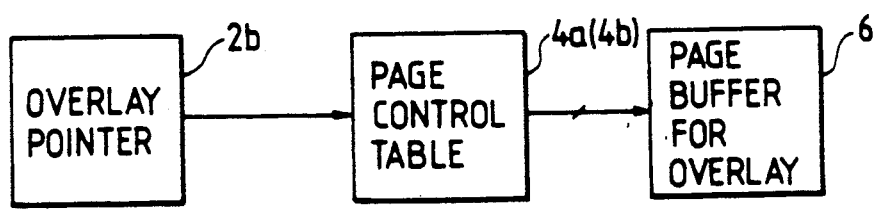
FIG. 2 is a schematic view showing instruction of writing into a page control table shown in FIG. 1.

FIG. 2 is a schematic view showing the storage of instructions into the page control tables 4a, 4b shown in FIG. 1, wherein the same components as those in FIG. 1 are represented by the same numbers.

FIGS. 3A to 3E are views of states of registration, showing the process of format information registration according to the present invention, wherein the same components as those in FIG. 1 are represented by the same numbers. In the following there will be explained the above-mentioned process.

Figure 3A:
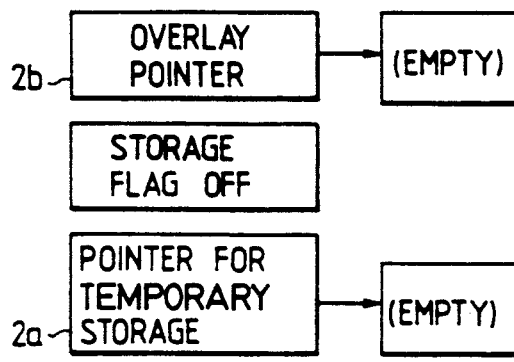
FIGS. 3A to 3E are views of states of registration showing the registration of format information according to the present invention.

At first, FIG. 3A shows a state prior to the preparation of the print data for the first face. In this state the page control table 4b designated by the temporary storage pointer 2a and the page control table 4a designated by the overlay pointer 2b do not have the page buffer and are therefore open. Naturally the storage flag (set in the flag area 2C) is turned off.

Figure 3B:
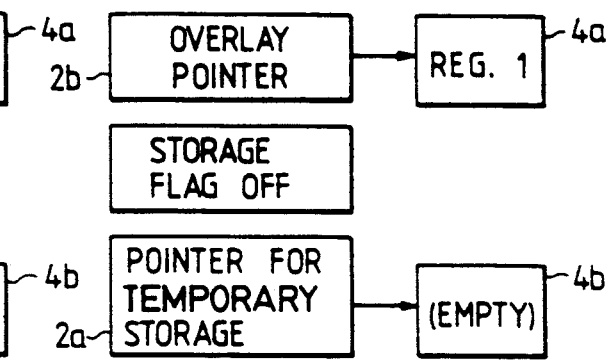

If an overlay registration is conducted in this area, since the page control table 4a designated by the overlay pointer 2b is empty, the format image stored in the overlay format information memory 5a is registered in the page control table 4a as shown in FIG. 3B.

Figure 3C:
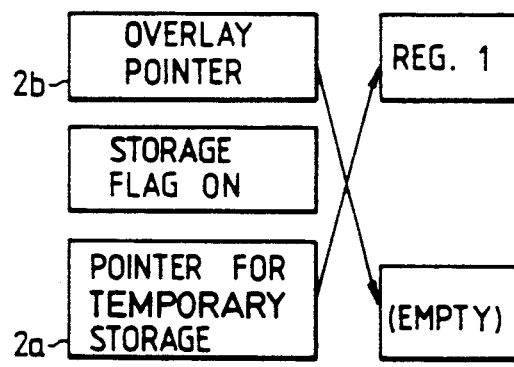

Upon completion of the preparation of the page buffer for printing by the reception of the print data for the first face, the content of the overlay pointer 2b, or the top address of the page control table 4a, is set, as the address of the page information to be overlaid in the first face, in the page control table 4a for the first face. Then a state shown in FIG. 3C is reached when an instruction is processed for starting the registration of a format to be overlaid in the second face and thereafter. More specifically, the temporary storage pointer 2a is replaced by the overlay pointer 2b designating the page control table 4a of the first face, by the exchange of the top address of the page control table 4a designated by the overlay pointer 2b with that of the page control table 4b designated by the temporary storage pointer 2a. In this state the storage flag (set in the flag area 2c) is turned on.

Figure 3D:
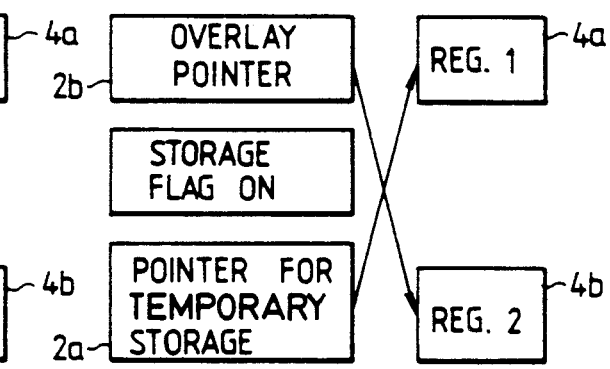
Figure 3E:
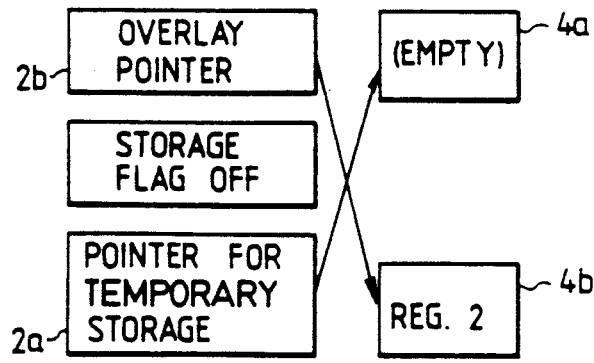

The overlay information to be overlaid in the second face and thereafter is stored, as shown in FIG. 3D, in the empty page control table 4b designated by the overlay pointer 2b. After the reception and preparation of the data of the second face, the top address of the page control table 4b designated by the present overlay pointer 2b is set as the overlay page information in the page control table 4b constituting the page control table of the second face. Then, after the discharge of a sheet on which the data for the first and second faces are printed, the state of the storage flag is checked. If it is on, it is cleared since the overlay information in the page control table 4a designated by the temporary storage pointer 2a is no longer necessary, and there is thus deleted the information of the page buffer linked with the page control table 4a designated by the temporary storage pointer 2a. Thus the information of the one of the page buffers is cleared as shown in FIG. 3E, whereby a state shown in FIG. 3B is reached.

The above-mentioned storage flag is not only provided for the deletion of the page buffer. If an overlay registration is conducted prior to the reception of the print data of the second face in a state shown in FIG. 3D, there is lost the previously stored overlay information. In order to prevent such situation if an overlay registration is made prior to the reception of the data of the second face and if the storage flag is on in such state, the latest registered page control table 4b designated by the present overlay pointer 2b is erased, and a new page control table 4b is prepared.

In the following there will be explained the overlay form registration and the sheet discharge according to the present invention, with reference to FIGS. 4 and 5.

FIG. 4 is a flow chart showing an example of the overlay form registration according to the present invention, wherein (1) to (7) indicate process steps.

At first CPU 1 executes the initialization of flags prior to the registration (step 1), and discriminates whether the processing is at a point immediately before the preparation of the data for the second face (step 2). If not, the sequence proceeds to a step (7). If affirmative, the CPU 1 discriminates whether the overlay mode is used in the first face (because, even when overlay information is registered, there may be a case in which the instruction for overlay in the first face is not given so that storage is not necessary) (step 3). If said discrimination turns out negative, the sequence proceeds to the step (7). If it turns out affirmative, the CPU turns on the storage flag in order to execute the storage (step 5), then exchanges the content designated by the current overlay pointer 2b with that designated by the temporary storage pointer 2a (step 6), and executes deletion if the overlay information is already linked to the page control table designated by the overlay pointer 2b, thereby enabling registration (step 7).

Figure 5:
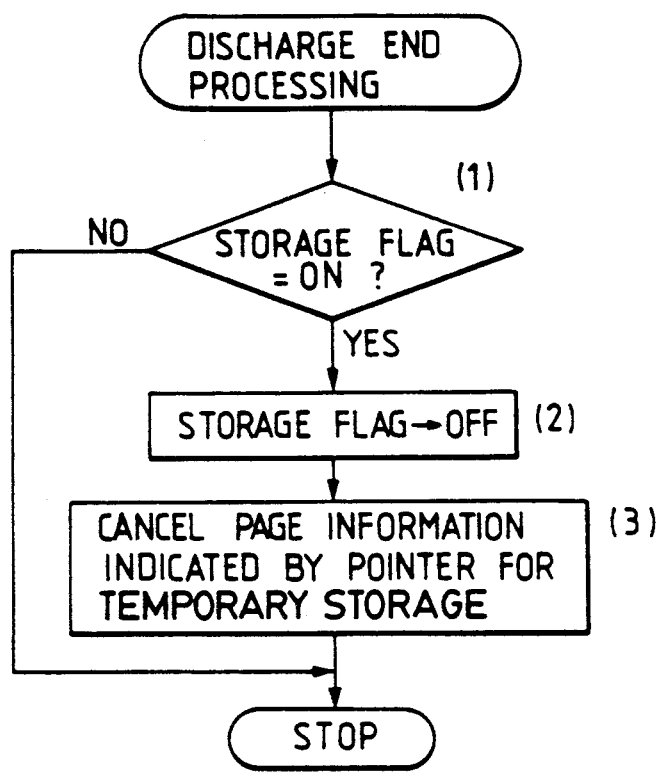
FIG. 5 is a flow chart showing an example of a sheet discharge ending process according to the present invention.

FIG. 5 is a flow chart showing an example of the sheet discharge process of the present invention, wherein (1) to (3) indicate process steps.

At first the CPU 1 discriminates the state of the storage flag (step 1), and, if it is off, the process is terminated. If it is on, the CPU turns off the storage flag (step 2), then deletes the page information in the page control table designated by the temporary storage pointer 2a (step 3), and terminates the process.

In the foregoing there has been explained the temporary storage of the overlay form information in order to prevent alteration therein, in a case of form overlays on both faces, but the present invention is likewise applicable to the two-side printing of externally registered characters.

As an example, let us consider a case of registering a character "(2)" for the first face, under a code "$7777_H$". If a character "(C)" is externally registered for the same code "$7777_H$" immediately before the printing of the second face, all the characters "(2)" on the first face are altered to "(C)".

However, different externally registered character patterns can be printed on both faces of the recording medium with the same code, by permitting the existence of the character "(2)" registered for the first face and the characters "(C)" registered for the second face under a same code. After the sheet discharge, there is deleted the externally registered character patterns (2) only, that has become unnecessary.

In the following there will be explained the data flow in another embodiment of the present invention, with reference to FIG. 6. Various data, such as character code data or data on the number of copies, sent for example from a host computer, is supplied through an input unit 101 to an interpretation/storage unit 102, in which the input data are discriminated for example as character code data, data on the number of copies, data on size etc., and are stored in respective areas of a page buffer 103. The character code data read from the page buffer 103 are converted into dot patterns in a development control unit 105, based on a font pattern stored in a font pattern storage unit 104, and are stored in a bit map memory 106. The dot patterns read from the bit map memory 106 are converted into video signals in an output control unit 107, and are supplied to a printing engine unit 108. Said engine unit 108 is for example a laser beam printer utilizing a laser and an electrophotographic process in combination, wherein said video signals are supplied to a laser driver, thereby activating said laser and effecting the printing operation.

Figure 6:
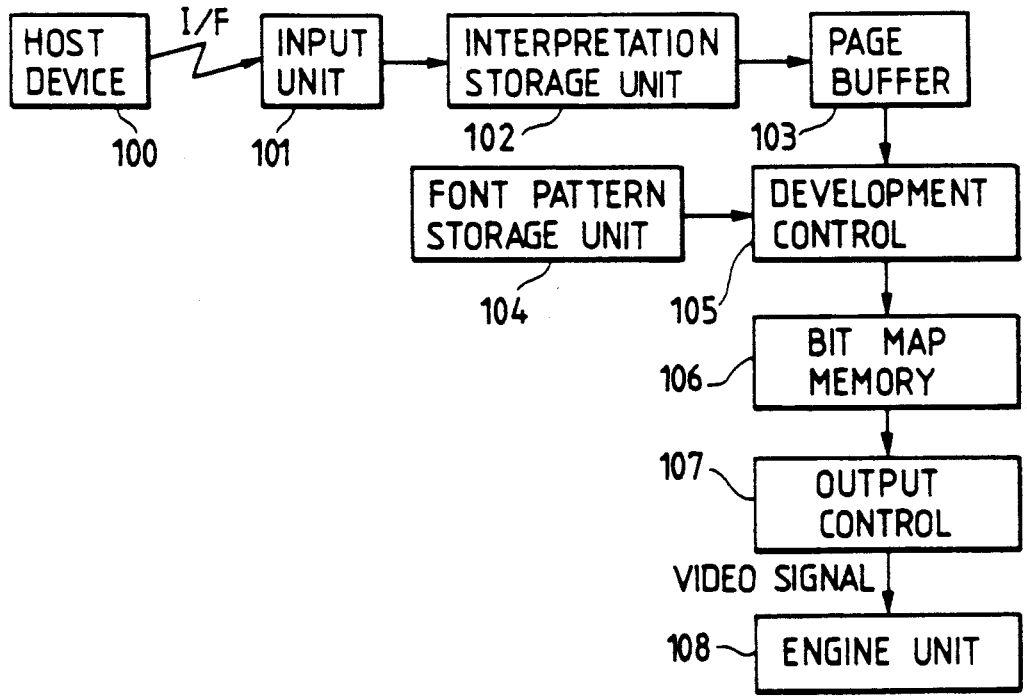
FIG. 6 is a schematic view showing an example of overlay printing operation.
Figure 7:
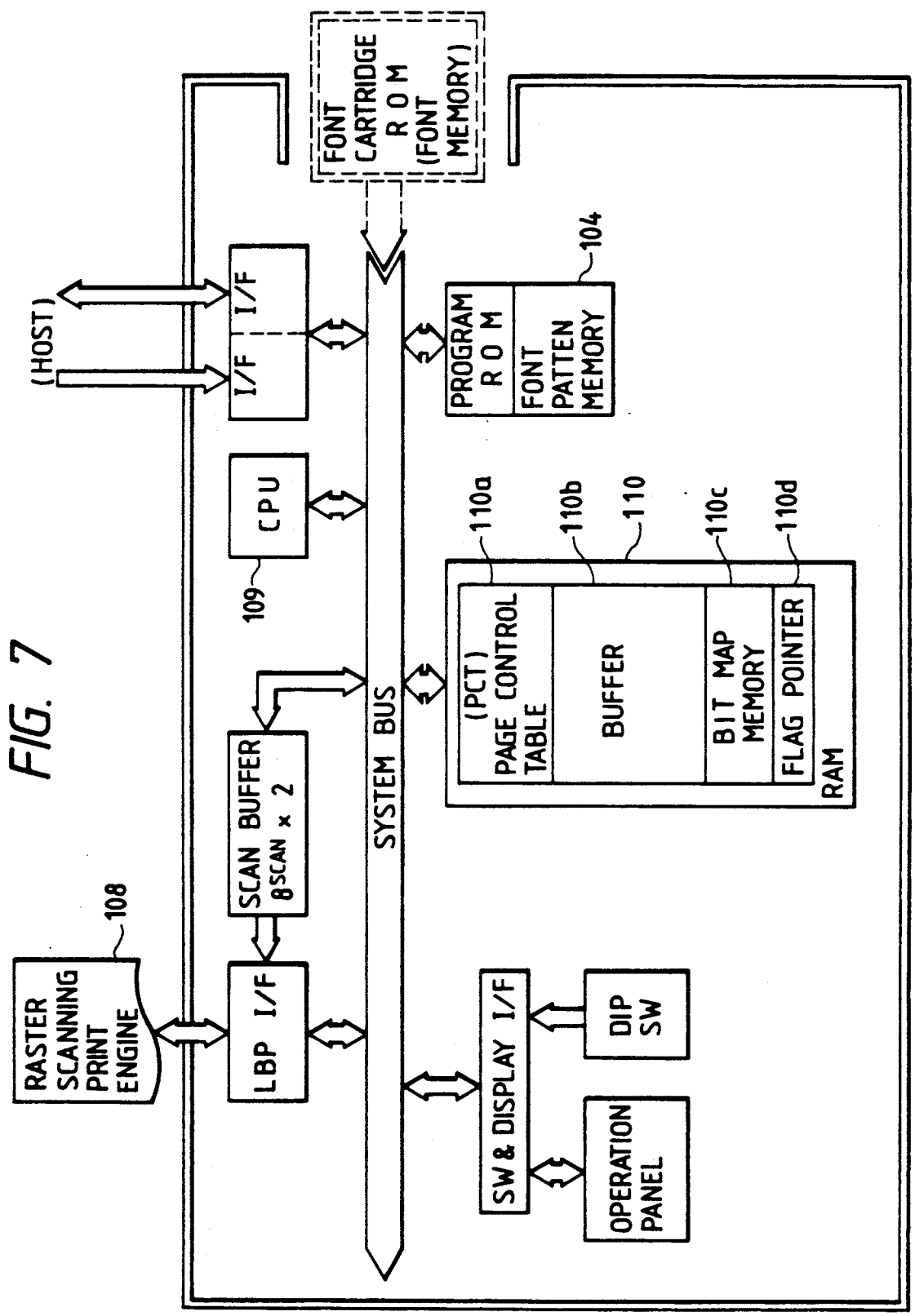
FIG. 7 is a view showing the flow of data in another embodiment of the present invention.

FIG. 7 is a block diagram of a control unit for realizing the data flow shown in FIG. 6, wherein components to equivalent to those in FIG. 6 are represented by the same numbers. The functions of the interpretation/storage unit 102, development control unit 105 and output control unit 107 are performed by a CPU 109. The buffer memory 103 and the bit map memory 106 correspond respectively to areas 110b, 110c of a RAM 110. The buffer memory area 110b, is so constructed as to be capable of storing data of plural pages. There are further provided a page control table area 110a, and an area 110b for various flags and pointers.

Figure 8:
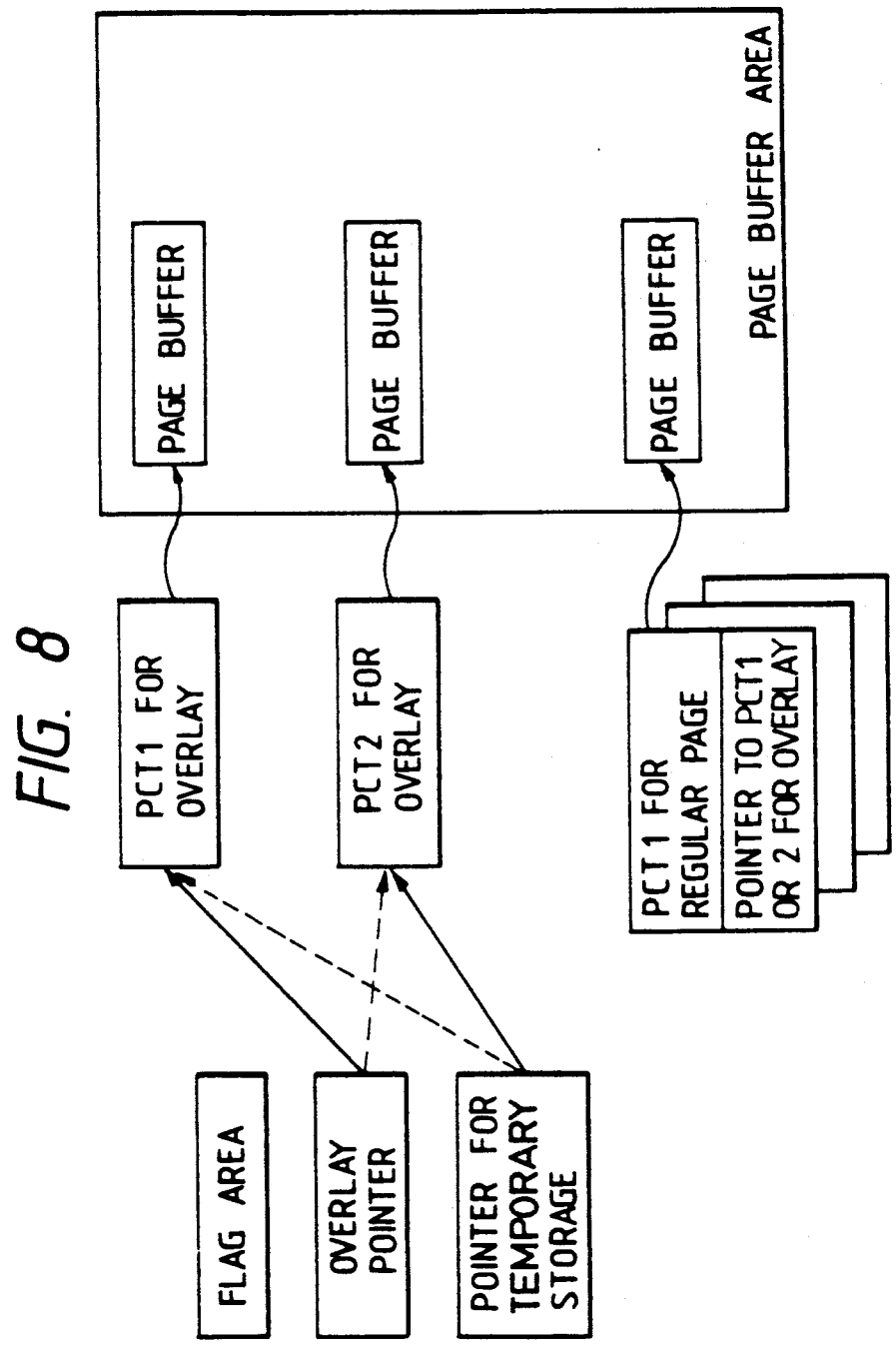
FIG. 8 is a block diagram of a control unit shown in FIG. 7 for data control.

FIG. 8 illustrates the relationship between the page control table and the page buffer.

The data sent from the host apparatus are either data for ordinary page or those for overlay, and the method of storage in the printing apparatus is made different accordingly. For the data of ordinary page, the page buffer storing the print data is controlled by the page control table for ordinary page.

On the other hand, for the data of overlay page, the overlay print data are stored in the page buffer under the control by the overlay page control table.

Figure 9:
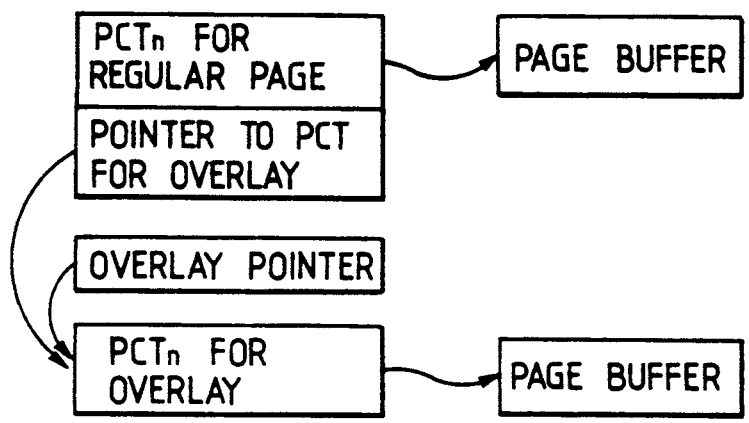
FIGS. 9 and 10 are views showing a format information registration process.
Figure 10:
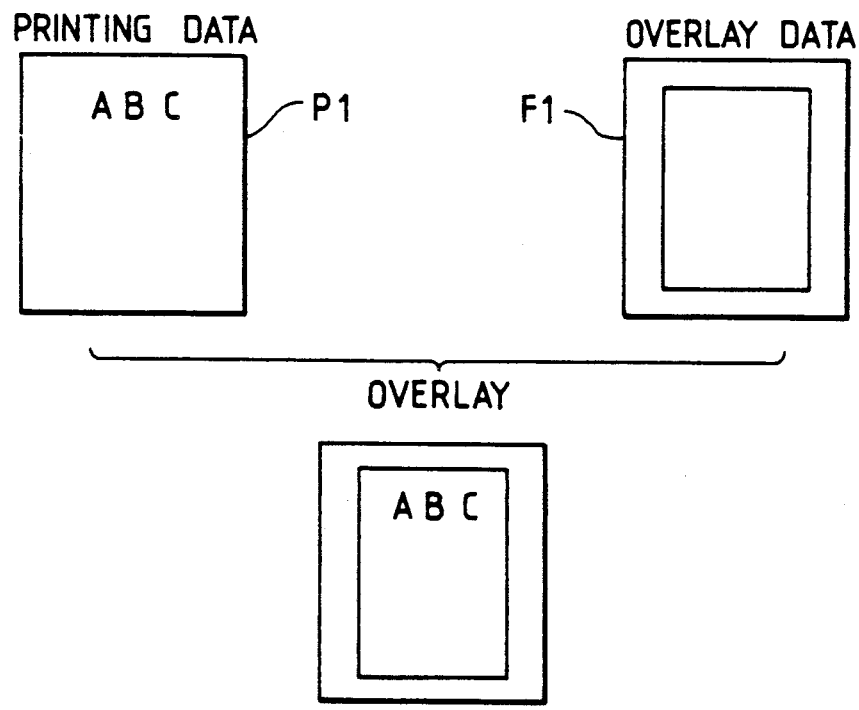

In case of overlaying the overlay data on an ordinary page, the ordinary page is linked with the overlay page, as shown in FIG. 9, by storing the address of the page control table for overlay indicated by the overlay pointer, in the pointer for the overlay page control table, included in the page control table for ordinary page.

If overlay information is further registered in the above-mentioned state (prior to the reception of data of the second ordinary page), the overlay information for the first ordinary page becomes altered, as the content of the overlay page control table indicated by the overlay pointer is replaced. For this reason, the flag is turned on to exchange the page control table designated by the overlay pointer and that designated by the temporary storage pointer, whereby the overlay pointer designates the empty page control page while the temporary storage pointer retains the page control table containing the previous overlay information. In this manner the above-mentioned registration is rendered possible. After said registration, if there is an instruction to overlay the overlay information on the second ordinary page, the newly registered overlay information is linked.

The printing process is started after the print data for two pages are prepared. The overlay information and the ordinary data for the second face are developed in the bit map memory area, from which said data are read and printed on the second face of the recording medium. Then the overlay information and the ordinary data for the first face are developed in said bit map memory area and printed on the first face of the recording medium. After the recording medium is discharged, the page buffer of the overlay page control table designated by the temporary storage pointer is released (flag off).

The overlay form registration and the sheet discharge mentioned above are similar to those already explained in relation to FIGS. 4 and 5, and will not, therefore, be explained further.

The above-explained control provides advantages of preventing the alteration or loss of the already registered overlay information by the new registration of overlay information, and achieving precise overlaid printing of the print information and format information specific to each print face.

The present invention is not limited to the foregoing embodiments but is subject to various modifications within the scope and spirit of the appended claims.

What is claimed is:

1. A recording control apparatus comprising:
    input means for entering data from external equipment;
    first and second memory means for storing form data;
    output means for outputting to a recording means the data entered via said input means and the form data in an overlaid manner as recording data for a first face or a second face of a recording material;
    first designating means for indicating that the form data is new form data to be overlaid;
    second designating means for indicating that the form data is previous form data; and
    control means for controlling said first and second memory means in such a manner that when first form data is entered from the external equipment, said first form data is stored in said first memory means, and when second form data is entered from the external equipment, said second form data is stored in said second memory means,
    wherein said first designating means is adapted, in storage of the first form data, to designate said first memory means, and while said first designating means is adapted, in storage of the second form data, to designate said second memory means, said second designating means is adapted to designate said first memory means.

2. An apparatus according to claim 1, wherein the form data stored in said first and second memory means are recording data for respective faces of the recording material.

3. An apparatus according to claim 1, wherein said first memory means and said control means are so structured and arranged that, after the recording material is discharged from said recording means, the form data stored in said first memory means is erased therefrom.

4. An image processing apparatus for both-side recording comprising:
    input means for entering first printing information and second printing information respectively representing first image data and second image data to be recorded on a first face and a second face of a recording medium, respectively;

first and second register means respectively adapted to register first and second pattern data corresponding to the first and second faces of the recording medium, respectively; and output means for outputting to a print unit a composition of the first image data and the first pattern data as recording data for the first face of the recording medium and for outputting to the print unit a composition of the second image data and the second pattern data as recording data for the second face of the recording medium.

5. An apparatus according to claim 4, wherein said first and second register means are adapted to register first and second form pieces of information as the first and second pattern data, respectively.

6. An apparatus according to claim 4, wherein said first and second register means are operative to hold the first and second pattern data, respectively, at least until said print unit discharges the recording medium which has been subjected to both-side recording.

7. A method of image processing for both-side recording comprising the steps of:

registering first pattern data to be recorded on a first face of a recording medium;

registering second pattern data to be recorded on a second face of the recording medium;

entering first printing information representing first image data to be recorded on the first face of the recording medium;

entering second printing information representing second image data to be recorded on the second face of the recording medium;

recording a composition of the first image data and the first pattern data on the first face of the recording medium; and recording a composition of the second image data and the second pattern data on the second face of the recording medium.

8. A method according to claim 7, wherein the first and second pattern data are form information.

9. A method according to claim 7, wherein the first and second pattern data are held at least until the recording medium, which has been subjected to both-side recording, is discharged.

10. An image processing apparatus for both-side recording comprising:

input means for entering data from external equipment;

first and second memory means, corresponding to a first face and a second face of a recording medium, respectively, for storing data; and generating means for generating recording data for the first face of the recording medium based on both the form data stored in said first memory means and printing data entered via said input means to be recorded on the first face of the recording medium, and for generating recording data for the second face of the recording medium based on both the form data stored in said second memory means and printing data entered via said input means to be recorded on the second face of the recording medium.

11. An apparatus according to claim 10, wherein said first an second memory means hold the form data, at least until the recording medium, which has been subjected to both-side recording, is discharged.

* * * * *

UNITED STATES PATENT AND TRADEMARK OFFICE
CERTIFICATE OF CORRECTION

PATENT NO. : 5,067,024

DATED : November 19, 1991

INVENTOR(S) : KATSUHIKO ANZAI

It is certified that error appears in the above-identified patent and that said Letters Patent is hereby corrected as shown below:

Drawing

SHEET 5 OF 7

FIG. 7, "PATTEN" should read --PATTERN--.

COLUMN 1

Line 12, "recordings" should read --recording,--.
    Line 21, "form overlay" should read --form-overlay--.
    Line 32, "face," should read --face--.
    Line 62, "of" (second occurrence) should be deleted.

COLUMN 3

Line 28, "flag area 2C)" should read --flag area 2c)--.

COLUMN 4

Line 8, "situation if" should read --situation, if--.
    Line 65, "characters "(C)"" should read --character "(C)"--.

COLUMN 5

Line 9, "size etc.," should read --size, etc.,--.

UNITED STATES PATENT AND TRADEMARK OFFICE
CERTIFICATE OF CORRECTION

PATENT NO. : 5,067,024　　　　　　　　　　　　　　　Page 2 of 2
DATED　　　 : November 19, 1991
INVENTOR(S) : Katsuhiko Anzai It is certified that error appears in the above-identified patent and that said Letters Patent is hereby corrected as shown below:

Column 8, line 32, "an" should read --and--.

Signed and Sealed this

Thirtieth Day of March, 1993

*Attest:*

STEPHEN G. KUNIN

*Attesting Officer*　　　Acting Commissioner of Patents and Trademarks